US008806955B2

(12) United States Patent
Wible et al.

(10) Patent No.: US 8,806,955 B2
(45) Date of Patent: Aug. 19, 2014

(54) FLUID FLOW CONDITIONER

(75) Inventors: Eric Wible, Carlsbad, CA (US);
Michael R. Noel, Encinitas, CA (US);
Brian McDole, San Marcos, CA (US)

(73) Assignee: Fluid Components International, LLC, San Diego, CA (US)

( * ) Notice: Subject to any disclaimer, the term of this patent is extended or adjusted under 35 U.S.C. 154(b) by 45 days.

(21) Appl. No.: 13/391,273

(22) PCT Filed: Aug. 24, 2010

(86) PCT No.: PCT/US2010/046540
§ 371 (c)(1),
(2), (4) Date: Feb. 17, 2012

(87) PCT Pub. No.: WO2011/031461
PCT Pub. Date: Mar. 17, 2011

(65) Prior Publication Data
US 2012/0144928 A1      Jun. 14, 2012

Related U.S. Application Data

(63) Continuation of application No. 12/547,320, filed on Aug. 25, 2009, now abandoned.

(51) Int. Cl.
*G01F 1/74* (2006.01)

(52) U.S. Cl.
USPC ........................................... 73/861.04

(58) Field of Classification Search
USPC ............................... 73/861, 861.04
See application file for complete search history.

(56) References Cited

U.S. PATENT DOCUMENTS

| 4,433,576 A | 2/1984 | Shih et al. |
| 4,929,088 A | 5/1990 | Smith |
| 5,780,737 A | 7/1998 | Wible et al. |

FOREIGN PATENT DOCUMENTS

| DE | 19839259 A1 | 3/2000 | |
| EP | 0309607 A1 | 4/1989 | |
| JP | 58180913 | * 10/1963 | ................ G01F 1/32 |
| JP | 58180913 A | 10/1983 | |

OTHER PUBLICATIONS

International Search Report (Dec. 7, 2010, 2 pages).
Written Opinion of the International Search Authority (Dec. 7, 2010, 6 pages).
ST 98 Mass Flow Meter for Air and Gases; Fluid Components International LLC (for context purposes).
ST Series Mass Flow Meters Combine Precision Accuracy and Economy; Fluid Components International LLC (for context purposes).
VORTAB VMR Flow Conditioner Meter Run for Flow Meters (Apr. 2007); Fluid Components International LLC.

* cited by examiner

*Primary Examiner* — Jewel V Thompson
(74) *Attorney, Agent, or Firm* — The Maxham Firm

(57) ABSTRACT

A device and method for conditioning media flowing within a conduit enabling sensors placed within short straight run distances to measure media flow with improved accuracy employing a thermal flow instrument. A flow conditioner downstream of a media flow measuring transducer has walls that diverge in the flow direction to optimize readings of the media flow from the transducer.

20 Claims, 7 Drawing Sheets

FLUID FLOW CONDITIONER

FIELD OF THE INVENTION

The invention relates generally to devices that condition flowing media within a conduit, and more particularly, to such devices that condition flowing media to enable more accurate readings of thermal flow sensors used to measure the flowing media.

BACKGROUND OF THE INVENTION

When using thermal flow meters, the accuracy of mass flow rate measurements of media traveling within a conduit can be adversely affected by random and unpredictable turbulence within the flowing media, as well as by the fact that flow rates are not uniform across the conduit cross section. Flow meters typically employ high performance sensing elements that can be uniquely designed for application requirements with precision signal processing and calibration of sensing elements and transmitting electronics. Random turbulence, or non-uniform flow, within the flowing media introduces inconsistencies in the transducer readings.

Thermal dispersion flow meters are well known and are commonly used to measure the flow of media within a conduit. Thermal technology utilizes the relationship between flow rate and cooling effect for direct measurement of mass flow rate. The media flowing in a conduit affects the temperature of sensing elements and this effect is used to create an electrical signal that can be processed to indicate the flow rate or mass flow rate of the media within the conduit.

Flow conditioning devices may be used to overcome random turbulence properties that occur in applications where non-ideal upstream flow conditions exist. These turbulence properties may be caused by valves, bends, or elbows, for example, within the conduit, as well as flow rates of the media, and viscosity properties of different types of media. The elements employed by thermal dispersion mass flow meters can suffer accuracy problems due to non-ideal flow conditions in the vicinity of the sensing elements. Such non-ideal flow conditions that exist upstream from the sensing elements can create inaccuracies in the readings obtained from the sensing elements.

Within the art of flow meters, numerous flow conditioning devices have been taught. Examples of known flow conditioners are those that use bars, perforated plates, tube bundles, or tab structures to condition media to enhance sensor readings.

One turbulence inducing prior art device is disclosed in U.S. Pat. No. 5,780,737. This sensor employs a bar mounted closely upstream from a transducer for the purpose of flow conditioning. The bar generates a predictable vortex stream (turbulence) a short distance upstream of a flow sensing element to counteract the random or unpredictable turbulence that exists within the media flowing through a conduit. The vortex stream generated by the flow conditioning bar is consistent and predictable compared with the non-conditioned turbulence within the flowing media upstream of the bar. Thus, any existing random turbulence within the flowing media is essentially overridden by the turbulence created by the vortex generating bar.

A completely different type of flow conditioner is shown in U.S. Pat. No. 4,929,088, which includes several radially, or longitudinally, or both, spaced tabs to create a mixing effect as well as conditioning the flow of the media in the conduit.

In order to measure media flowing within a conduit by means of a thermal flow meter, minimum straight runs of the conduit are typically needed for improved accuracy. In order to achieve optimum performance in industrial flow metering systems, upstream and downstream straight run requirements are typically quoted at about 20 conduit diameters upstream and about 10 diameters downstream. These straight run lengths are typically necessary in order to create a consistent flow profile and allow dissipation of the turbulence in the media that may result from elements such as bends, elbows, and valves in the conduits carrying the media. Implementing straight runs of these lengths is not always easy and sometimes impossible to satisfy in any particular installation. Metering systems with insufficient straight run lengths can suffer somewhat degraded meter accuracy if a consistent flow profile is not able to be developed.

SUMMARY OF THE INVENTION

The embodiments disclosed herein address some shortcomings in the prior art of measuring flowing media within a conduit. The problems associated with the length of straight run requirements in industrial flow metering for about 20 diameters upstream are addressed by flow conditioners disclosed herein. Embodiments are disclosed for flow conditioning that can be accomplished in substantially shorter straight run lengths than required without using flow conditioners. The embodiments disclosed herein provide methods and systems for conditioning media that flows within a conduit to reduce the impact that less than ideal media flow profile has on transducers used to measure the flowing media, thereby enhancing the accuracy of the transducers.

An embodiment of the invention provides a flow conditioner that can be used with existing flow measurement systems.

Another embodiment provides a flow metering method that conditions media flowing within a conduit to provide flow velocities impinging the transducers which are consistent with the nominal media velocity in the conduit.

BRIEF DESCRIPTION OF DRAWINGS

The purposes, advantages, and features of the invention will be more fully understood from the following detailed description, when read in conjunction with the accompanying drawing wherein.

DETAILED DESCRIPTION OF THE PREFERRED EMBODIMENTS

According to various embodiments for flow conditioning, the media that flows within a conduit can be either a gaseous or a liquid substance, so the term "fluid" may be used to include both. Therefore, the embodiments described herein should not be seen as limiting and the scope of the invention should be measured as defined by the appended claims. These embodiments generally describe gaseous media flowing within a conduit, but it should be understood that liquid embodiments are also envisioned. Also, the metering systems illustrated in these embodiments are generally thermal flow meters to measure flow of media within a conduit using transducer elements and it should be understood that other measuring elements can also be used with the flow conditioners described herein. Any type of thermal flow metering system may be employed, including differential temperature, differential power, and differential current, for example. It is also envisioned that alterations may be made to the embodiments taught herein to condition the flow of liquid media within a conduit.

Figure 1:
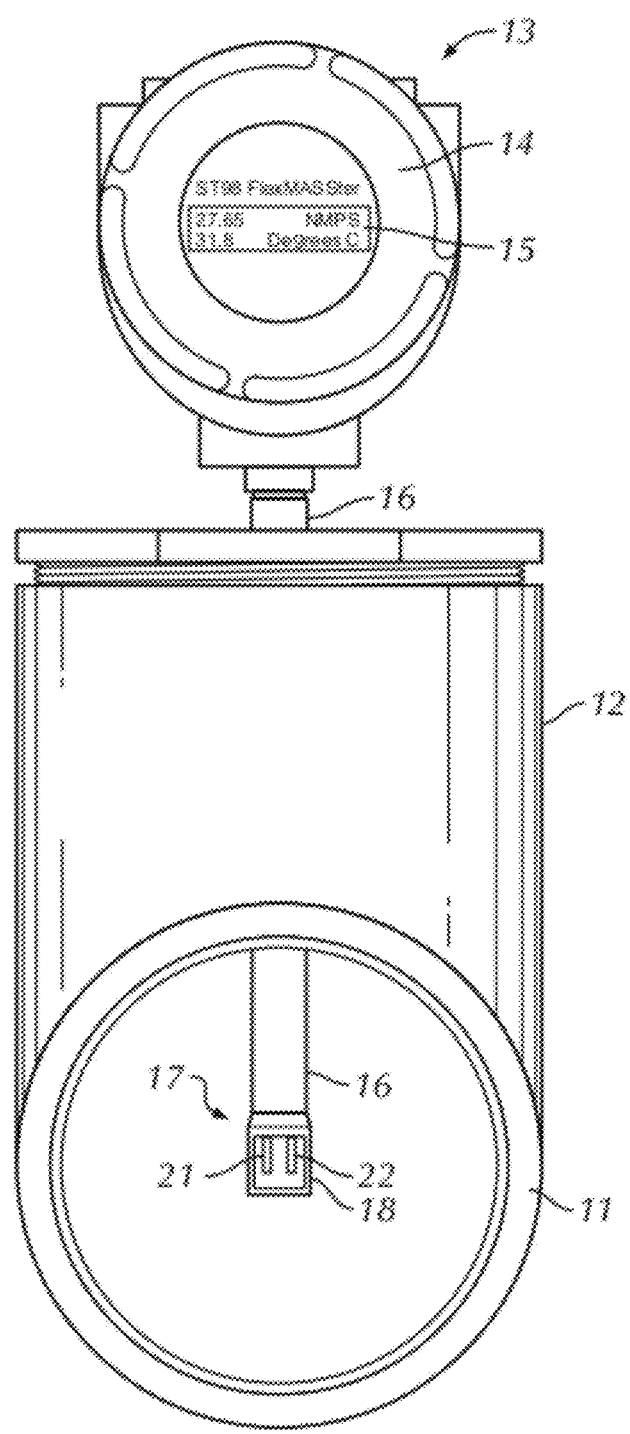
FIG. 1 is an end view of a conventional flow meter mounted to a fluid conduit segment.

A conventional mass flow meter is illustrated in FIG. 1. Conduit 11 has T-connector 12 to which flow meter assembly 13 is mounted. The flow meter has head 14 typically containing the electronics of the instrument and having digital readout 15. Probe 16 extends from head 14 into conduit 11. At about the center of the conduit is sensor 17 comprising transducers or sensing elements 21 and 22, which are protected in the media stream by protector 18. The actual sensing elements reside within the cylindrical elements shown, which are referred to as thermowells. The thermal flow meter shown operates in a known manner.

FIGS. 2-6 illustrate an embodiment of flow conditioner and sensor 25 formed in a cylindrically shaped device having a longitudinal axis as indicated by centerline 30. Sensors 26 and 27 are the sensing elements of the thermal flow metering system, similar to assembly 13 in FIG. 1, which measures flow of a media flowing within a conduit such as conduit 11 in FIG. 1. An example of such a metering system is model ST98, sold by Fluid Components International LLC of San Marcos, Calif. The metering system shown in FIG. 2 includes a flow conditioner comprised preferably of wedge structure or element 31 and shroud 32 that conditions the flow of the media in the vicinity of flow sensing transducers 26 and 27 in order to provide enhanced mass flow readings of the flowing media. The transducers are typically thermowells containing thermal sensing elements. Shroud 32 is mounted on cap 33 at the distal end of probe 16. The shroud surrounds wedge 31 and sensors 26 and 27. The distal end of the metering system comprising sensors 26 and 27, wedge element 31, and shroud 32, is inserted into a conduit (not shown in this figure) in a manner that allows media to continue to flow through the conduit. The sensor elements of the flow meter are at the distal end of the cylindrical probe 16 which project through the wall of the conduit in a conventional manner and are generally positioned at approximately the center of the conduit, as shown in FIG. 1.

Figure 2:
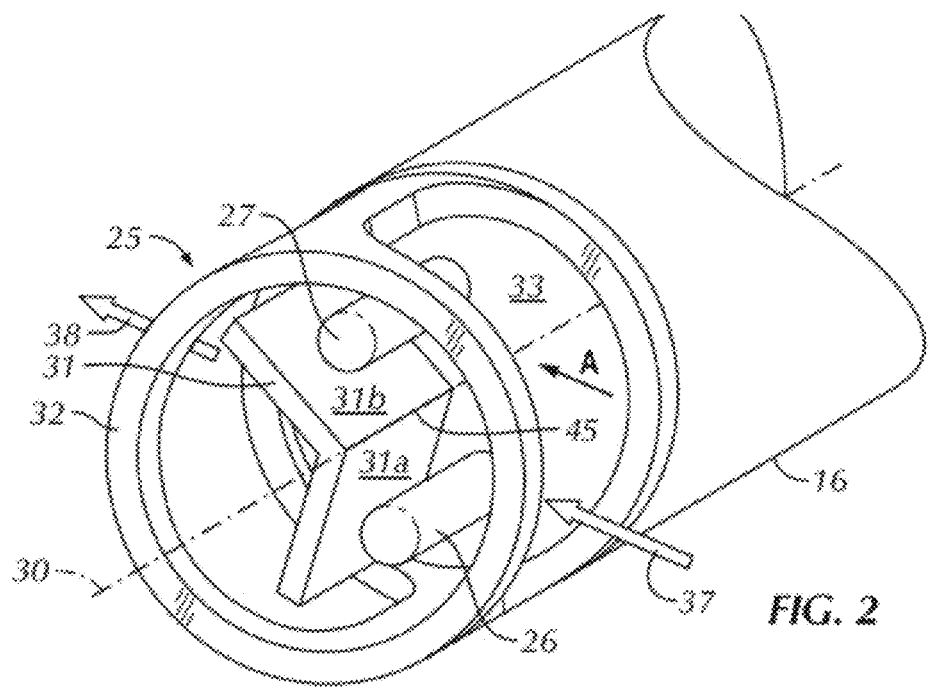
FIG. 2 is a perspective illustration of an embodiment of a flow conditioner according to the invention.
Figure 3:
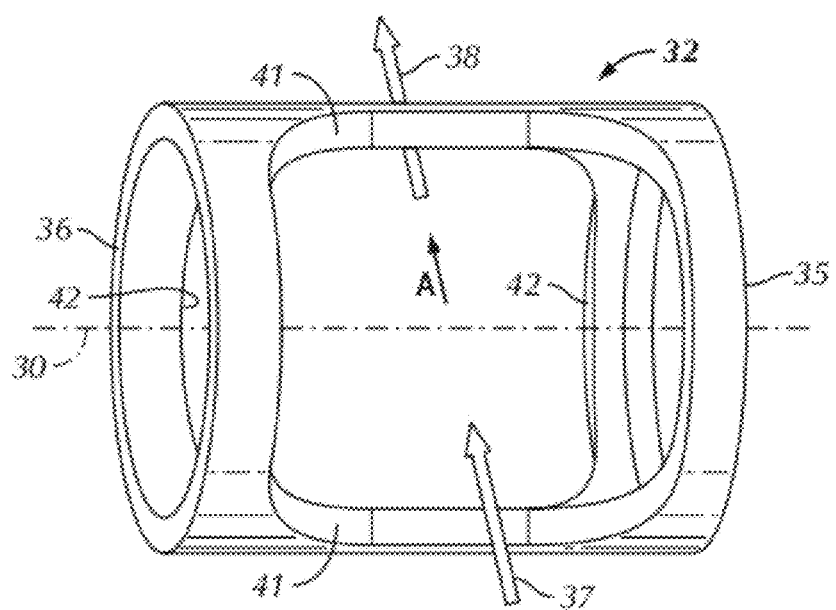
FIG. 3 is an enlarged illustration of an embodiment of the shroud used in the FIG. 2 flow conditioner.

FIG. 3 is an enlarged perspective view of shroud 32. Shroud 32 and cap 33 (FIG. 2) of cylindrical probe 16 may be secured together by any suitable means, such as by welding, or the use of an appropriate adhesive, among others. Either end 35 or 36 of the shroud may be secured to the cap since the shroud is shown here as being symmetrical. However, there is no requirement that the shroud be symmetrical. Cap 33 may be formed with a groove to receive an appropriately shaped annular rim of the shroud, or either or both the cap and the shroud may be shaped in an desired fashion to facilitate them being secured together. Input opening 37 is defined by peripheral rim 41, while peripheral rim 42 defines output opening 38. From this view it can be seen that openings 37, 38 are diametrically opposed and enable passage of flowing media therethrough, even with wedge element 31 and sensors 26, 27 projecting therein. The media flows through openings 37, 38 in the shroud in the direction of arrow A, as seen in FIGS. 2 and 3. Wedge element 31 is mounted within shroud 32 such that it is downstream of sensors 26, 27 in the direction of the flowing media. Alternatives to the shape of the shroud will be discussed below with respect to FIG. 5.

The sensor and flow conditioner 25 illustrated in FIG. 2 could be combined with an industry standard ST98 flow meter, previously identified, with the added components of flow conditioner elements 31 and 32. The ST98 instrument is an insertion style, thermal dispersion mass flow meter that measures the temperature difference between elements, here sensors 26, 27. In the conventional manner for thermal flow instruments, one of the elements is a reference sensor and the other is an active, or heated, sensor. Flowing fluid dissipates heat from the active sensor and the differential temperature, in relation to the current or power applied to the active probe, for example, with the conventional electronics of such a system, converts these data points to a measure of mass flow of the fluid in the conduit.

Stated another way, shroud 32 and wedge element 31 are components that can be configured with an industry standard metering system, such as the ST98 thermal dispersion mass flow meter. This metering system is identified for example only and the flow conditioner of the invention can be employed with a variety of thermal flow measurement systems.

Figure 4:
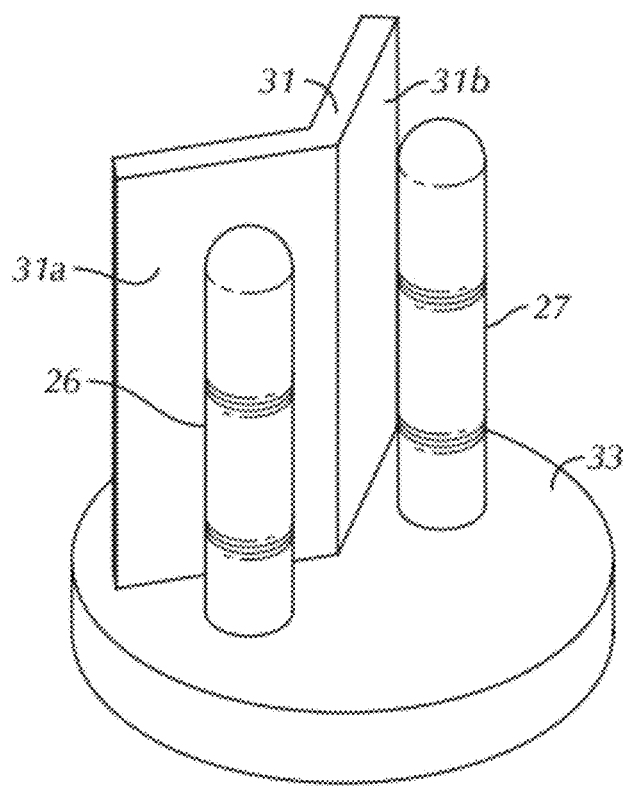
FIG. 4 show the end cap, the thermowells, and the wedge shaped element of the flow conditioner of the present invention.
Figure 5:
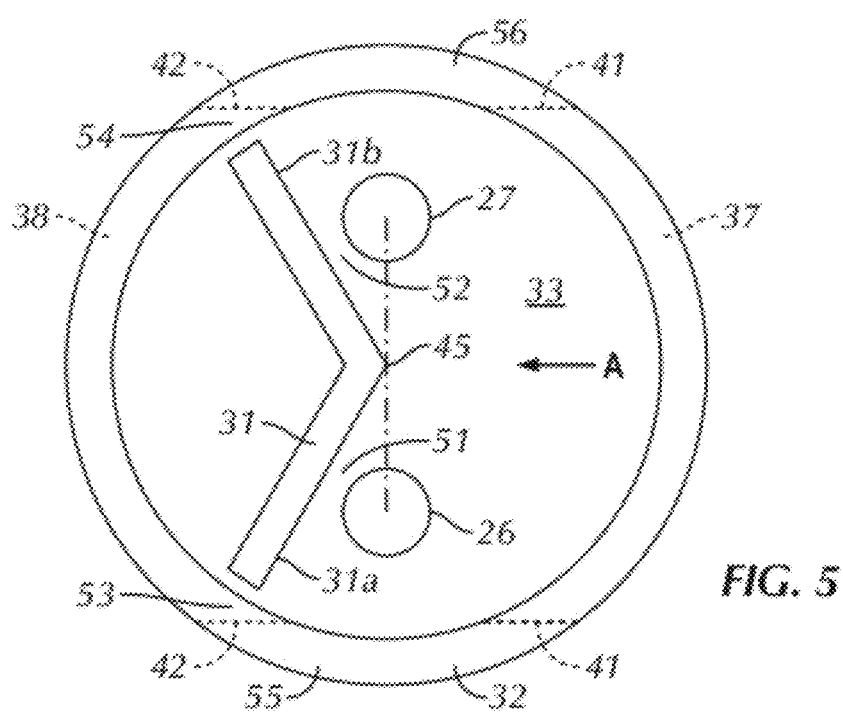
FIG. 5 is an end view of the flow conditioner of FIG. 2.
Figure 6:
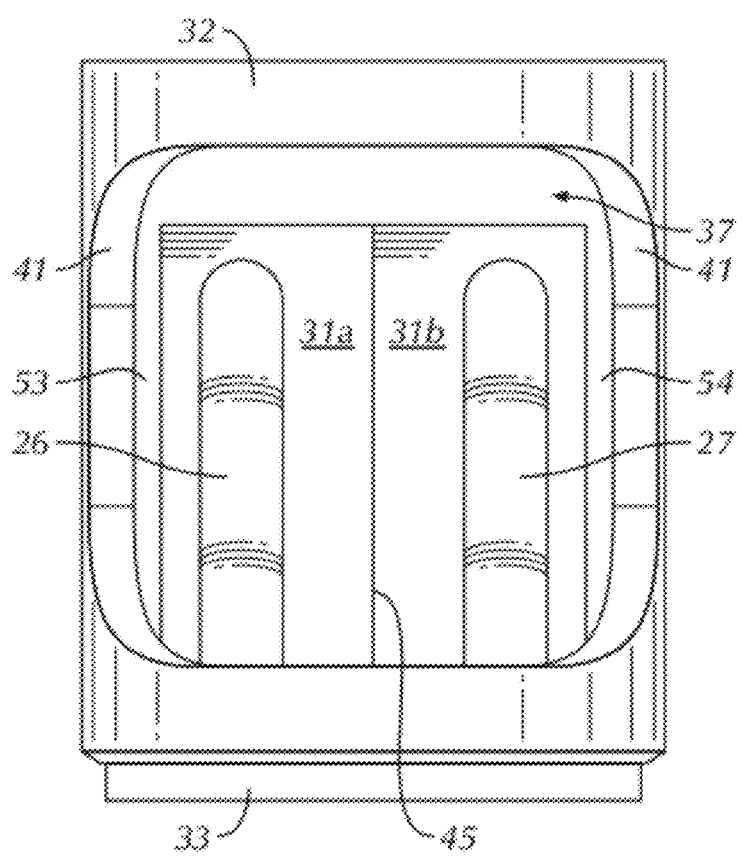
FIG. 6 is a side view of the flow conditioner of FIG. 2.

Wedge element 31 as shown in FIGS. 2, 4, and 5, when viewed in the direction of longitudinal axis 30, has a substantially V-shape with walls 31a, 31b arranged to diverge from a center or apex 45 in direction A of the flowing media. The apex of V-shaped element 31 is shown essentially equidistant from sensors 26, 27 and extends at least partially between the sensors (see FIG. 5). The specific configuration and orientation of the embodiment shown in FIG. 2 is illustrative of one embodiment and should not be viewed as limiting the invention. For example, the size and/or shape of wedge element 31 can be altered, and this will be addressed below.

In differing embodiments, diverging walls 31a, 31b can be arranged or positioned in various configurations. The diverging walls can be formed to be various heights either relative to the size and height of upstream opening 37, to shroud 32, or to the projecting lengths of thermowells 26, 27. Height, as discussed here, relates to a distance in the longitudinal direction from cap 33 of probe 16, and an embodiment is shown clearly in FIG. 6. It may also be referred to as "length." Diverging walls 31a, 31b can be formed to have a height nearly as high as opening 37 in the direction of longitudinal axis 30. In the particular embodiment shown, wedge 31 extends in length about 15% farther from cap 33 than do sensors 26, 27. Thus, the length of wedge 31 may be about 1.91 cm (0.75 inch) and the sensors could be about 1.68 cm (0.66 inch) in a typical installation. However, the length could be shorter or longer than the sensors and still function effectively, and the sensors and wedge element can be longer or shorter, depending upon the size of the conduit, or upon the type of media being measured.

Figure 7:
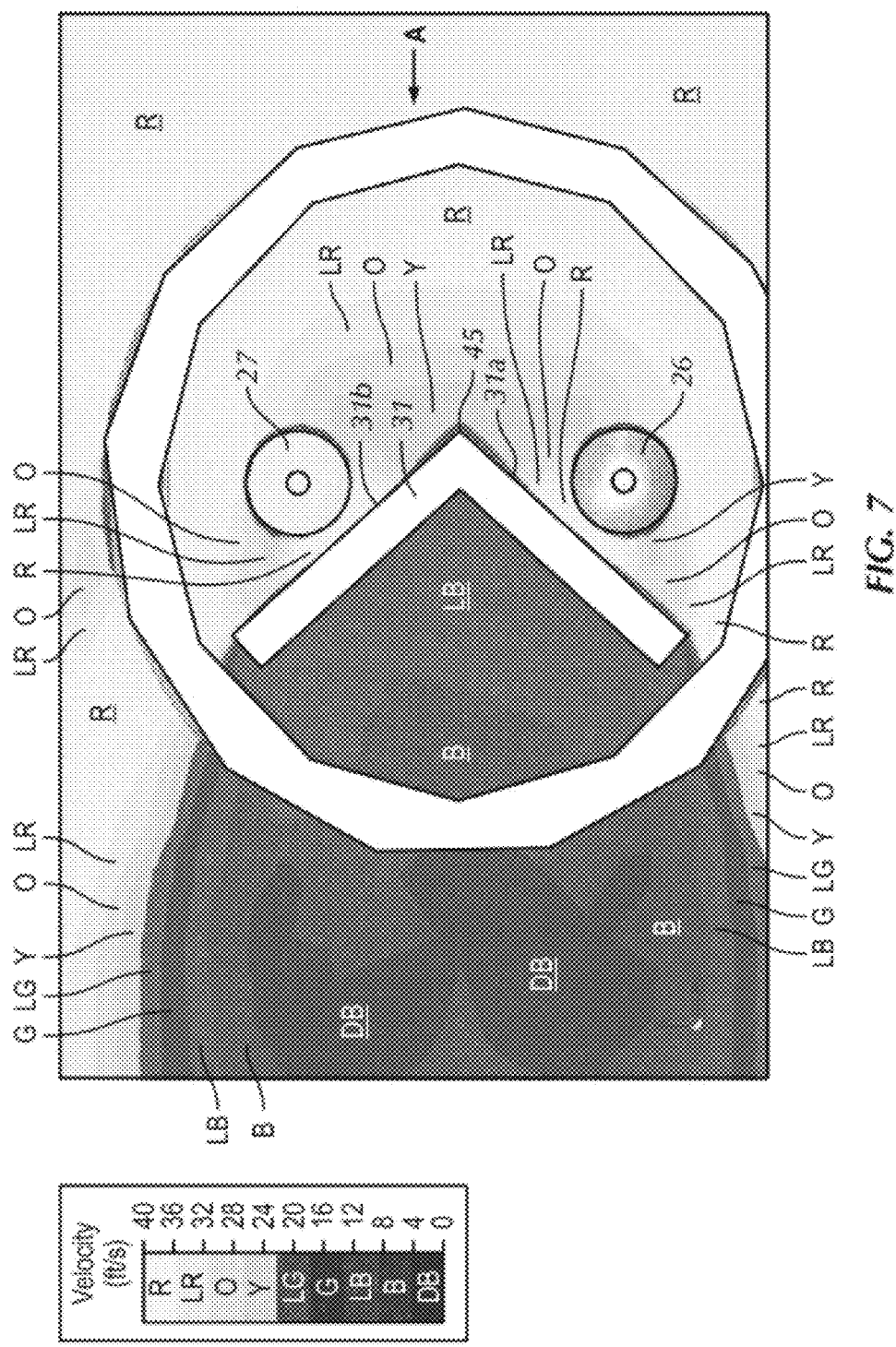
FIG. 7 illustrates a media velocity diagram for a flow metering system similar to the one in FIG. 1 with an embodiment of a flow conditioner in accordance with the invention.

The media flowing in the direction of arrow A is forced to impact walls 31a, 31b and move around wedge element 31, as shown graphically in FIG. 7.

One rationale for measuring the length of walls 31a, 31b in the direction of longitudinal axis 30 to be in relation to the height of sensors 26, 27, is that the sensing or heated areas within the thermowells is normally somewhere near the linear center of the probe in the direction of longitudinal axis 30. A good deal of variance could then be allowed within embodiments using thermal transducers in forming limits of the height of walls 31a, 31b in the direction of longitudinal axis 30. These variances can be employed for embodiments using different media and in different circumstances to enhance the effectiveness of flow conditioner 25 in creating consistent flow velocities in the vicinity of sensors 26, 27.

As shown in FIGS. 5 and 7, wedge element 31 is mounted downstream of sensors 26, 27 such that the flowing media will pass through opening 37 and encounter the sensors before impacting upon walls 31a, 31b of wedge element 31. The presence of the diverging walls just downstream from the sensors dramatically reduces the turbulence of the media observed in the vicinity of and surrounding the sensors, compared to similar arrangements for such probes without wedge element 31. This phenomenon will be further discussed below with respect to FIG. 7.

Figure 8:
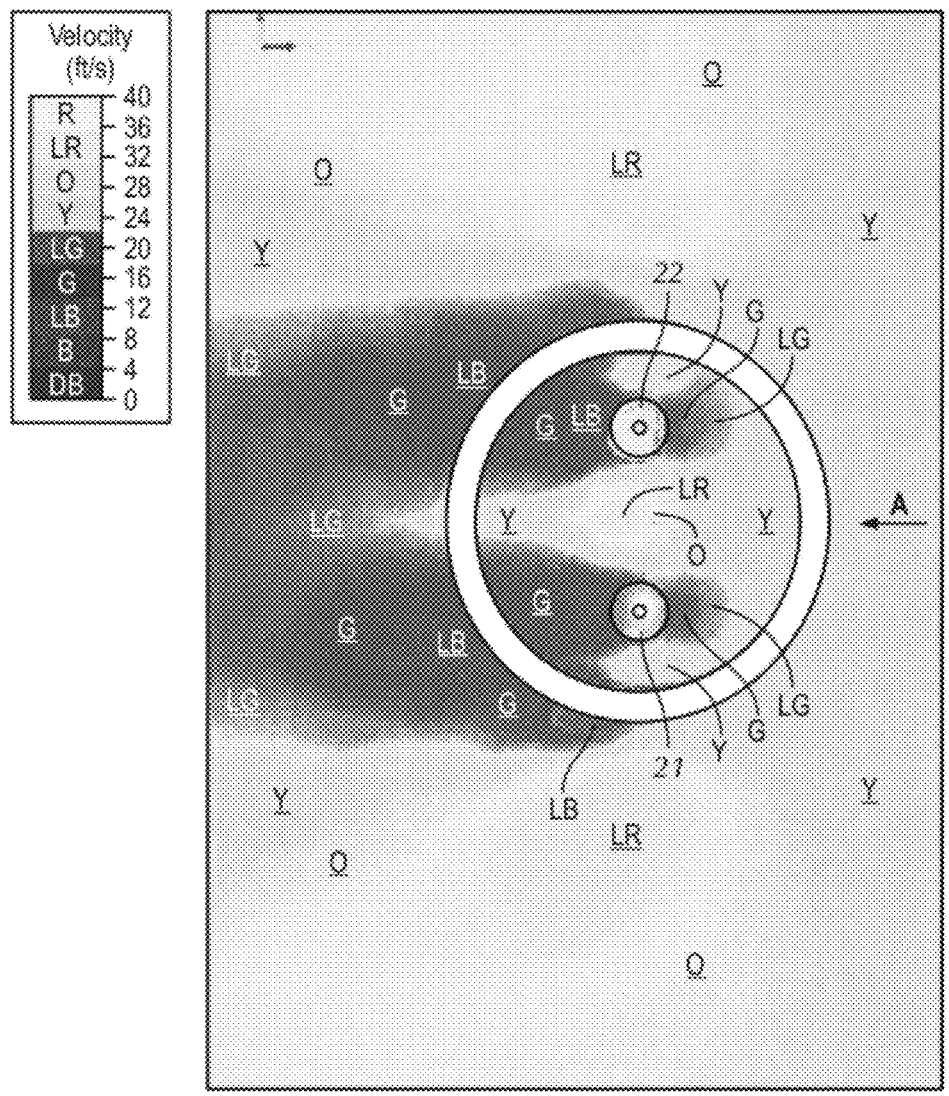
FIG. 8 illustrates a media velocity diagram for a flow metering system similar to the one in FIG. 1, without a flow conditioner of the present invention.

FIG. 8 illustrates velocity patterns that have been observed for a prior art flow metering system, such as that shown in FIG. 1, having thermal sensors 21, 22 but without flow conditioner 25. The nominal flow at the center of the conduit, in this example, is about 7.62 meters (25 feet) per second. The legend for the velocity pattern is shown in the chart to the left of the velocity diagram, and the following describes the flow velocity with respect to the legend. LR is areas having a flow rate of about 10.51 meters (34.5 feet) per second; O is areas having a flow rate of about 9.36 meters (30.7 feet) per second; Y is areas with a flow rate of about 7.62-9.14 meters (25-30 feet) per second, that is, approximately nominal flow velocity; LG is areas with a flow rate of about 7.01 meters (23 feet) per second, near nominal flow velocity; G is areas with a flow rate of about 5.79 meters (19 feet) per second; LB is about 3.05 meters (10 feet) per second; and B is areas with a flow rate of 1.22-2.44 meters (4 to about 8 feet) per second. As clearly evident from FIG. 8, the flow rates are much higher at a distance from sensors 21, 22, and there is substantially no, or insignificant, 7.62 meters (25 feet) per second flow in contact with the sensor elements. In fact the flow rates in contact with sensors 21, 22 are not at all consistent with the nominal flow of 7.62 meters (25 feet) per second, and the average velocity of the media in contact with the sensors is well below the nominal flow rate. Immediately upstream of sensors 21, 22, the velocities are shown as about 5.79 meters (19 feet) per second and immediately downstream of these sensors the velocities of the media are all the way down to 2.44-3.05 meters (8-10 feet) per second. The low rate between the sensors is actually higher than the nominal flow rate, but that flow area is not in contact with the sensors. The flow velocities in close vicinity of sensors 21, 22 are not truly representative of the nominal flow rate of the media in the conduit, which is the flow with respect to which the flow meter is intended to measure. Therefore, the mass flow rate detected by sensors 21, 22 may not fairly represent what is actually happening within the conduit.

FIG. 7 illustrates velocity patterns that have been observed for a flow metering system, such as that shown in FIG. 2 having thermal sensors 26, 27, except that in FIG. 7 flow conditioner 25 is included with flow meter assembly 13.

In this case the nominal flow rate is about 12.19 meters (40 feet) per second. The legend for the velocity pattern will now be described, with reference to the chart to the left of the velocity diagram. R is areas having a flow rate of about 12.19 meters (40 feet) per second or higher; LR is areas having a flow rate of about 10.06 meters (33 feet) per second; O is areas having a flow rate of about 8.53 meters (28 feet) per second; Y is areas with a flow rate of about 7.32 meters (24 feet) per second; LG is areas with a flow rate of about 6.10 meters (20 feet) per second; G is areas with a flow rate of about 4.88 meters (16 feet) per second; LB is areas with a flow rate of about 2.44-3.66 meters (8-12 feet) per second; and B is areas with a flow rate of between 0 and about 1.22 meters (4 feet) per second. It can be clearly seen from FIG. 7 that the flow rates in the vicinity of sensors 26, 27 are much more consistent with the nominal flow rate upstream of flow metering system 13 than was observed for the flow in the metering system of FIG. 8. The flow rates in contact with sensors 26, 27 range from higher than 12.19 meters (40 feet) per second down to about 7.93 meters (26 feet) per second. Since both probes are significantly partially surrounded by media flow at or above about 12.19 meters (40 feet) per second, the readings of the flow meter will be much more accurate than is the meter of FIG. 8. These flow rates in the close vicinity of sensors 26, 27 are very much consistent with the nominal flow rate in the conduit.

In order to obtain the advantageous flow around the sensors that is depicted in FIG. 7, some exemplary dimensions are here set forth. The angle of apex 45 between the sides of wedge 31 can range from about 90°-140°, and preferably about 120°. The distance between walls 31a, 31b and respective sensors 26, 27 (gaps 51, 52 in FIG. 5) is about 0.04-0.11 cm (0.015-0.045 inch), preferably about 0.08 cm (0.030 inch). From FIG. 5 it can be seen that apex 45 is shown at about the centerline between sensors 26, 27. For a 120° apex, this is preferred, but not exactly mandatory. For other apex angles, the position of the apex with respect to the centerline between the sensors will vary, it being preferable to maintain the distance from walls 31a, 31b to the sensors generally in the 0.08 cm (0.030 inch) range.

While the foregoing discussion relates to the symmetric arrangement of walls 31a, 31b, apex 45, and thermowells 26, 27, those relationships are not required for embodiments of the invention to function in a useful manner. The relationships between one of the wedge walls and its adjacent thermowell is primarily relevant only for the active sensor. The wedge wall adjacent to the reference sensor is not nearly as important. Thus, the apex could be moved up or down (with respect to the FIG. 5 orientation), as long as the venturi-like effect is maintained with respect to the sensor that is the active or heated one. Further, if the apex angle is increased to greater than about 120°, the apex might reside left of a tangent line from thermowell 26 to thermowell 27. Conversely, with a sharper angle, less than about 120°, the apex could project beyond the right tangent line from the thermowells.

As can be seen from FIG. 7, a venturi-like effect is created as the media flows around sensors 26, 27 and is confined by wedge walls 31a, 31b. This has the effect of at least partially surrounding the sensor element with the media being measured at or near a constant ratio of the nominal flow rate and with a reduced turbulence. By actual measurements, the flow velocity through gaps 51, 52 is a constant portion of the nominal flow rate, thus resulting in the average being near the nominal flow rate.

Figure 9:
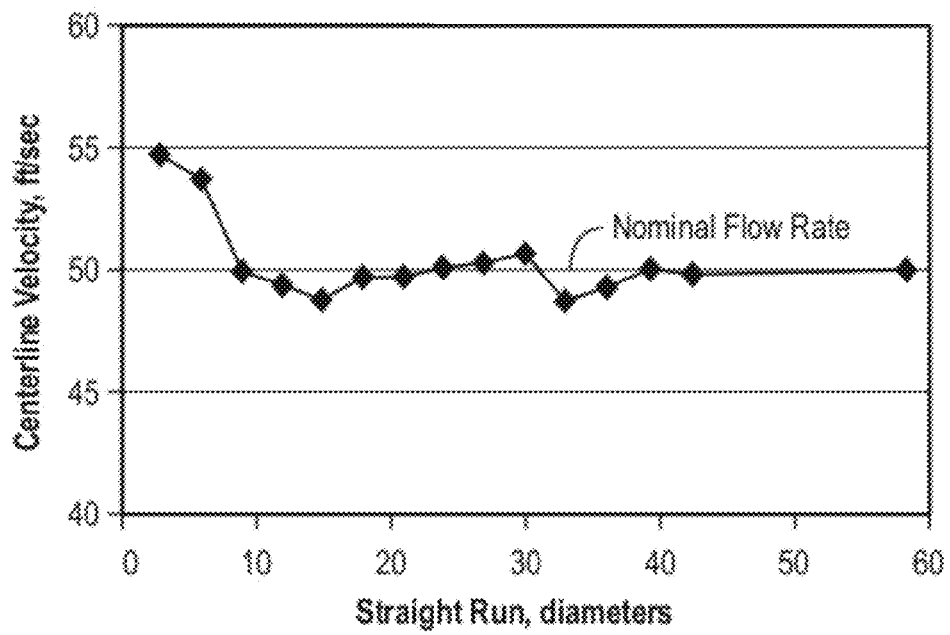
FIG. 9 is a plot of centerline versus straight run velocity in conduit diameters for media flowing in a conduit without the flow conditioner of the present invention.

FIG. 9 shows how unpredictably varied the centerline velocity of flow is from about 5 to about 18 diameters after a disturbance source, such as a bend, elbow, or valve, for example. It is very easy to understand that a thermal flow transducer that is inserted into the conduit at any point less than about 20 diameters downstream from the cause of unstable flow can provide inaccurate readings. Certainly there is much greater heat dissipation in the active sensor element at three to five diameters, where the flow rate is about 16.46 meters (54 feet) per second while the nominal flow rate is 15.24 meters (50 feet) per second and settles in to that velocity at about 20 diameters.

Referring again to FIGS. 2 and 7, in conjunction with the conventional sensor in FIG. 8 the improvements observed using a conventional flow meter with a flow conditioner comprising wedge element 31 and shroud 32 is a result of decreased turbulence of the flowing media in the vicinity of sensors 26, 27 after passing through opening 37 in shroud 32. The diverging walls 31a, 31b of the wedge element forces flowing media to move around the wedge element and to reduce the media turbulence through gaps 51 and 52. Flowing media is forced to move either above the wedge element, or through crevices 53, 54 between the distal ends of walls 31a, 31b and the sides of shroud 32, after impacting walls 31a, 31b, resulting in the average velocity of the flowing media in the vicinity of the sensors being maintained at about the nominal velocity and at a constant ratio of the velocity of the main stream. Because flow conditioner 25 makes the media flow around the thermowells predictable and consistent, turbulence of the flowing media around sensors 26, 27 is reduced, thereby enhancing the accuracy of the readings derived from the sensors.

It has been found that sides 55, 56 of the shroud, coupled with crevices 53, 54 (FIG. 5) combine to increase flow around sensors 26, 27. Although they can vary, it has been found that by making crevices 53, 54 to be about 0.03 cm (0.0120 inch), the meter has consistent and accurate output. Sides 55, 56 are shown to have an included arc of about 55°, and they could range between about 25° and about 75°.

In FIG. 5 the shroud is shown with input opening 37 and output opening 38. While the spacing between sides 55, 56 and the distal ends of the walls 31a, 31b is, in some embodiments, beneficial to the accuracy of the meter with which the flow conditioner functions, the shape and size of output opening 38 is not in itself significant. Once the media has encountered thermowells 26, 27 and walls 31a, 31b, and crevices 53, 54, it is not relevant how the media egresses from the flow conditioner.

As an alternative embodiment, the wedge element in combination with the sensors (FIG. 4) provides improved mass flow readings, even without the shroud. This structure is a simplified and effective flow conditioner. The combination with shroud 32 (FIGS. 2 and 5) provides even greater degrees of accuracy for the meter. From the physical standpoint, shroud 32 protects the rather delicate sensor elements from being damaged by handling, and by impurities and debris that may be flowing with the media in the conduit. Additionally, the shroud has a synergistic effect on the accuracy of the mass flow readings for the meter equipped with wedge 31, because it affects the flow of media through the shroud. It has also been found that the shroud alone, without the wedge, improves the meter accuracy. This is yet another alternative embodiment. The flow conditioner, whether it employs the wedge only with the thermowells, the shroud only with the thermowells, or combines the wedge and the shroud with the thermowells, tends to moderate upstream disturbances and the otherwise resulting random turbulence which thereby caused increased heat transfer resulting in errors in the accuracy of the prior meters.

Figure 10:
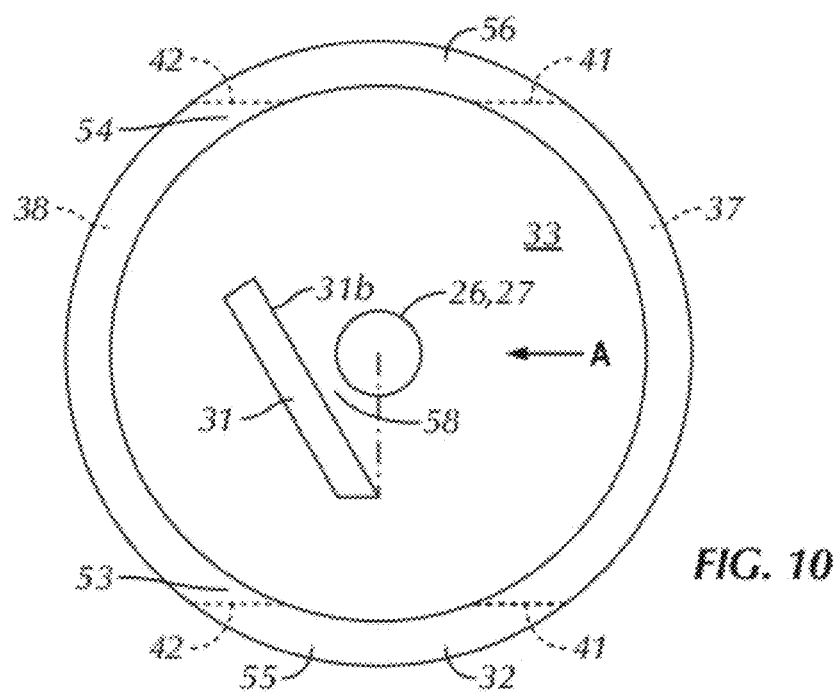
FIG. 10 is an end view, similar to FIG. 5, showing an alternative embodiment according to the invention.

In some instances thermal flow metering systems employ a single sensor, which operates on a time share basis. That is, instead of having one heated, or active sensor, and one non heated, or reference, sensor, the single sensor switches between being the heated sensor and being the reference sensor. In such an embodiment, only a single diagonal wall would replace the wedge element and would be arranged in close proximity to the thermowell containing the sensor. That proximity is discussed in greater detail below. Such an embodiment is shown in FIG. 10. In this embodiment, the sensors in thermowells 26, 27 are combined into a single, time-shared sensor element. Only a single vane 31 having it wall 31b adjacent to the thermowell is required. When the sensor is the active, or heated, sensor, the media flow through gap 58 decreases the turbulence around at least a portion of the thermowell. As stated previously, the flow around the thermowell when it is functioning as the reference sensor is not of particular significance because it represents the ambient temperature of the media and is not a measure of thermal dissipation. Other than operating in a time shared manner, the FIG. 10 embodiment functions in substantially the same way as the other embodiments presented herein. The angle of wall 31b with respect to the media flow direction A is about 45°-700°.

The sensors are mounted to and extend through cap 33 in a conventional manner. Wedge 31 may be mounted to cap 33 by any suitable means, such as welding, brazing, or through the use of a suitable adhesive. Similarly, shroud 32 is also secured to cap 33. It is also possible to mold or machine the cap and shroud together or even the cap, shroud and wedge together.

It is contemplated that the media with which the structure of the embodiments of the invention that are shown and suggested here can be any type of fluid, whether a liquid or a gas. Further, while wedge 31 is shown having an open V-shape, it could be a filled in wedge, giving it a delta shape, or it could be arcuate, either convex or concave. In other words, the downstream shape of wedge 31 is generally not significant. It is the shape and position of walls 31a, 31b, interacting primarily with thermowells 26, 27, and shroud 32, that provides the most advantageous function of the embodiments of the invention. While the wall or walls of wedge 31 are shown to be continuous, they could function as necessary for the embodiments contemplated even if they were formed as a screen, or with a plurality or a multiplicity of holes, or with slots. The media would flow over such non-continuous surfaces sufficiently to be efficacious.

What is claimed is:

1. A fluid flow conditioner device for use with a thermal mass flow instrument having at least one thermowell having a sensing element therein configured to be arranged in the media flow in a conduit, the media within the conduit flowing in a predetermined direction, the sensing element being heated for at least a portion of the time that the media is flowing in the conduit, the device comprising:
   a first wall element arranged a predetermined distance downstream from said at least one thermowell, said first wall element being orientated at an angle with respect to the media flow direction, the distance between said first wall element and said at least one thermowell being sufficiently close to cause the media flowing between said at least one thermowell and said first wall element to be substantially free or turbulence.

2. The device of claim 1, the thermal mass flow instrument further comprising a second thermowell having a sensing element therein, said second thermowell being spaced from said at least one thermowell, said device further comprising:
   a second wall element positioned at an angle with said first wall element to form a pair of diverging walls having a wedge-shaped structure having a center positioned generally equidistance from said thermowells, the distance between said walls and the respective thermowells being sufficiently close to cause the media flowing between each said thermowell and each respective said wall element to be substantially free of turbulence.

3. The device of claim 2, and further comprising a shroud element partially encompassing said wedge-shaped structure and said thermowells, said shroud element having passageways therethrough to enable the media to flow through while encountering said wedge-shaped structure and said thermowells.

4. The device of claim 3, wherein said shroud element is formed with opposing, spaced walls defining an upstream opening and wherein said diverging walls of said wedge-shaped structure have distal ends that are spaced from said spaced walls of said shroud downstream of said thermowells by a predetermined distance.

5. The device of claim 3, wherein said thermowells and said wedge-shaped structure extend substantially coextensively into the interior of said shroud.

6. The device of claim 2, wherein said center of said pair of diverging walls meet at an angle of about 90°-140° downstream in the flow direction.

7. The device of claim 6, wherein the line formed by said pair of diverging walls is normal to the flow direction.

8. The device of claim 2, wherein at least one of said thermowells includes a heated sensor and the other includes a reference sensor, at least said heated sensor thermowell being spaced from said at least one of said diverging walls by a predetermined distance.

9. The device of claim 2, and further comprising a shroud element partially encompassing said wedge-shaped structure and said thermowells, said shroud having an upstream opening therein, the upstream opening being formed to permit the media to flow into said shroud and to impinge upon said thermowells and said wedge-shaped structure.

10. The device of claim 9, wherein said shroud element is formed with opposing, spaced walls defining the upstream opening and wherein said diverging walls of said wedge-shaped structure, have distal ends that are spaced from said spaced walls of said shroud downstream of said thermowells by a predetermined distance.

11. The device of claim 9, wherein said thermowells and said wedge-shaped structure extend substantially coextensively into the interior of said shroud.

12. The device of claim 1, wherein said wall element is arranged at an angle of about 45°-70° with respect to the flow direction of the media.

13. A method for conditioning media flowing in a predetermined direction within a conduit having a thermal mass flow instrument therein comprising at least one thermowell with a sensing element arranged in the media flow in the conduit, the method comprising:
  installing a first wall adjacent to and downstream from the at least one thermowell at an angle with respect to the media flow direction and sufficiently close to the at least one thermowell to cause the media flow to be substantially free of turbulence as it flows past the at least one thermowell.

14. The method of claim 13 wherein:
  the at least one thermowell comprises two spaced parallel thermowells having sensing elements therein where one of the thermowells is heated; and
  installing a second wall adjacent to and downstream from a respective thermowell, the first and second walls being joined together to form a pair of diverging walls having a wedge-shaped structure having a center positioned generally equidistant from the spaced thermowells.

15. The method of claim 14, and further comprising channeling the flowing media around and past the wedge-shaped structure and the thermowells by means of a shroud partially surrounding the wedge-shaped structure and the thermowells, the shroud being formed with an opening upstream from the thermowells in the flow direction.

16. The method of claim 15, wherein the shroud is formed with opposing, spaced walls defining the upstream opening, and further comprising positioning the pair of diverging walls of the wedge-shaped structure such that the pair of diverging walls end adjacent to and spaced from the spaced walls of the shroud by a predetermined distance.

17. The method of claim 14, wherein the center is formed at upstream ends of the pair of diverging walls in the flow direction and the wedge-shaped structure has an angle of about 90°-140° facing downstream in the flow direction.

18. The device of claim 1, wherein the first wall element has a downstream end and an upstream end, the upstream end being located generally laterally with respect to the at least one thermowell in relation to the direction of media flow.

19. The device of claim 2, wherein the center of the wedge-shaped structure is located generally between the first and second thermowell.

20. The device of claim 2, wherein the center of the wedge-shaped structure is located at least partially between the first and second thermowell.

* * * * *

UNITED STATES PATENT AND TRADEMARK OFFICE
CERTIFICATE OF CORRECTION

PATENT NO.       : 8,806,955 B2                                  Page 1 of 1
APPLICATION NO.  : 13/391273
DATED            : August 19, 2014
INVENTOR(S)      : Wible et al.

It is certified that error appears in the above-identified patent and that said Letters Patent is hereby corrected as shown below:

In the Claims

Column 8, in claim 1, line 57, change "or" to --of--.
Column 9, in claim 10, line 37, delete the "," after "structure".

Signed and Sealed this
Ninth Day of June, 2015

Michelle K. Lee
*Director of the United States Patent and Trademark Office*